(12) United States Patent
Renggli

(10) Patent No.: US 6,199,772 B1
(45) Date of Patent: Mar. 13, 2001

(54) LINEAR ACTUATION AND VECTORING RING SUPPORT MECHANISM FOR AXISYMMETRIC VECTORING NOZZLE

(75) Inventor: Bernard J. Renggli, Cincinnati, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/383,134

(22) Filed: Aug. 25, 1999

(51) Int. Cl.[7] .................................................. B05B 12/00
(52) U.S. Cl. ........................ 239/265.33; 239/265.19; 239/265.35; 239/265.39; 239/265.41
(58) Field of Search .................. 239/265.33, 265.41, 239/265.19, 265.39, 265.35; 60/228, 230, 232

(56) References Cited

U.S. PATENT DOCUMENTS

| 4,994,660 | * | 2/1991 | Hauer ............................. 239/265.41 |
| 5,150,839 | * | 9/1992 | Reedy ............................. 239/265.41 |
| 5,174,502 | * | 12/1992 | Lippmeier et al. ............. 239/265.41 |
| 5,329,763 | | 7/1994 | Ibarreche Mendia et al. . |
| 5,437,411 | | 8/1995 | Renggli . |
| 5,442,909 | | 8/1995 | Snow et al. . |
| 5,485,959 | * | 1/1996 | Wood et al. ..................... 239/265.41 |
| 5,779,152 | | 7/1998 | Renggli et al. . |
| 5,893,518 | | 4/1999 | Bruchez, Jr. et al. . |

* cited by examiner

Primary Examiner—Charles G. Freay
Assistant Examiner—Ed Hayes
(74) Attorney, Agent, or Firm—Andrew C. Hess; Rodney M. Young

(57) ABSTRACT

Three vectoring ring support and actuation apparatuses are disposed in an equi-angular manner circumferentially about the engine casing. Each of the vectoring ring support and actuation apparatuses includes a vectoring ring means to transfer side loads from the vectoring ring to the engine casing, a vectoring ring translation means for allowing the ring to be translated, and a support pivoting means and ring gimballing means to allow the vectoring ring attitude adjustments by a set of linear actuators. The vectoring ring support apparatus transfers side loads acting on a vectoring ring and generated by a gas turbine engine thrust vectoring nozzle to a relatively stationary portion of the engine and allows tilting of the vectoring ring to vector the thrust of the nozzle. Each linear actuator is connected by a slider bar to the vectoring ring, a first actuator joint connects the linear actuator to a forward end of the slider bar, and an aft actuator joint connects an aft end of the slider bar to the vectoring ring. The aft actuator joint preferably is a ball joint having three rotational degrees of freedom and the forward actuator joint is preferably a clevis joint.

36 Claims, 6 Drawing Sheets

LINEAR ACTUATION AND VECTORING RING SUPPORT MECHANISM FOR AXISYMMETRIC VECTORING NOZZLE

BACKGROUND OF THE INVENTION

1. Field of the Invention

This invention relates generally to axisymmetric variable throat thrust vectoring nozzles and, more particularly, to a linear actuation and vectoring ring support and actuation apparatus for the actuating and supporting vectoring ring that is used to pivot the nozzle flaps that vector the nozzle exhaust flow.

2. Discussion of the Background Art

For military aircraft applications, there exists a need to increase the maneuverability of the aircraft, both for air to air combat missions and complicated ground attack missions. Aircraft designers seek to replace or augment the use of conventional aerodynamic surfaces such as flaps and ailerons with vectorable nozzles which turn or vector the exhaust flow and thrust of the gas turbine engine powering the aircraft. U.S. Pat. No. 4,994,660, issued to Hauer discloses an axisymmetric vectoring exhaust nozzle that provides a means for vectoring the thrust of an axisymmetric convergent/divergent nozzle by universally pivoting the divergent flaps of the nozzle in an asymmetric fashion or, in other words, pivoting the divergent flaps in radial and tangential directions with respect to the unvectored nozzle centerline. The flaps are pivoted by a vectoring ring which can be axially translated and gimballed or tilted about its horizontal and vertical axis (essentially have its attitude adjusted) through a limited range.

Vectored thrust produces tangential and radial loads referred to as side loads that are transmitted from the flaps by various load paths back to the engine casing through the actuators. These tremendous loads require heavy actuators to absorb the loads and, particularly, the bending moments exerted on the actuator shafts by thrust vectoring. U.S. Pat. No. 5,174,502, issued to Lippmeier et al. discloses a support for the vectoring ring that transfers at least a portion of the side loads acting generated by a gas turbine engine thrust vectoring nozzle to a relatively stationary portion of the engine. U.S. Pat. No. 5,174,502 discloses an apparatus to minimize or eliminate the side loads transferred by the nozzle to the actuators, reduce or eliminate the bending moments that the actuators would be subject to due to the radial loads, and to minimize the size and weight of the nozzle actuators and hydraulic system used to power the actuators. The support includes pivotal links that provides for allowing two degree of freedom (2 DOF) pivoting or gimballing motion and axial translation of the vectoring ring. One of the embodiments has a dual link support means with a rectangular first link pivotally attached to the engine casing by a hinge. The first link is pivotally connected to a second link which in turn is universally hinged to the vectoring ring by a 3 DOF or spherical joint.

SUMMARY OF THE INVENTION

Briefly, in accordance with one aspect of the present invention, a vectoring ring support and actuation apparatus is provided for actuating a vectoring ring and transferring the side loads acting on the vectoring ring and generated by a gas turbine engine thrust vectoring nozzle to a relatively stationary portion of the engine and tilting the vectoring ring to vector the thrust of the nozzle. The vectoring ring support and actuation apparatus includes a linear actuator connected by a slider bar to the vectoring ring. A first actuator joint connects the linear actuator to a forward end of the slider bar and an aft actuator joint connecting an aft end of the slider bar to the vectoring ring. A vectoring ring support apparatus slidably supports the slider bar, restrains circumferential movement of the vectoring ring, and transfers side loads acting on the vectoring ring to a relatively stationary portion of the engine. The aft actuator joint preferably has three degrees of freedom and the forward actuator joint has one rotational degree of freedom. The aft actuator joint preferably is a ball joint having three rotational degrees of freedom. The forward actuator joint is preferably a clevis joint including two lugs interdigitated with and pivotably pinned to three lugs.

In one embodiment of the present invention, the vectoring ring support apparatus includes at least one guide assembly having a hollow guide mounted on a casing of the engine by a support structure and the slider bar slidably supported within the guide. Preferably, the vectoring ring support apparatus includes forward and aft ones of the support wherein the aft support is spaced apart from and aft of the forward support. Another embodiment includes rollers mounted to and inside of the hollow guide and disposed between the guide and the slider bar. Other embodiments provide the slider bar being hollow rectangular or cylindrical in cross-section. In the cylindrical embodiment, an annular liner bearing is slidably disposed about the cylindrical slider bar and is retained by radially running slots or tracks in the circumferential ring support assembly.

In the drawings as hereinafter described, a preferred embodiment is depicted; however, various other modifications and alternate constructions can be made thereto without departing from the true spirit and scope of the invention.

Among the advantages provided by the linear actuation and vectoring ring support apparatus of the present invention is the combined ability to reduce or even eliminate the side loads transferred to the vectoring ring actuators and the bending moments that the actuators and their arms would be subjected to with the ability to actuate the vectoring ring. The present invention also reduces the overall size of the structure needed to perform both of these functions as compared to designs in the prior art and reduces the number of parts used to provide the combined functions of the invention. The present invention combines the actuation and support mechanisms for the vectoring ring rather than splitting up the functions of ring support and ring actuation into two separate interface points on the vectoring ring and accomplishes the two functions of ring actuation and support with a single mechanism making the apparatus less complicated and structurally improved over that of the prior art. The invention frees up space in the circumferential direction along the exhaust duct or engine casing, making it easier to find room for other nozzle hardware.

The present invention eliminates a set of devises on the vectoring ring which would be used to fasten the actuators to the ring, thus, simplifying the ring and reducing its cost and weight. Placing the vectoring ring actuators in front of and in line with the support and actuation apparatus of the present invention opens up space in the circumferential direction around the nozzle engine casing, making it easier to find room for other nozzle hardware.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

DETAILED DESCRIPTION

Figure 1:
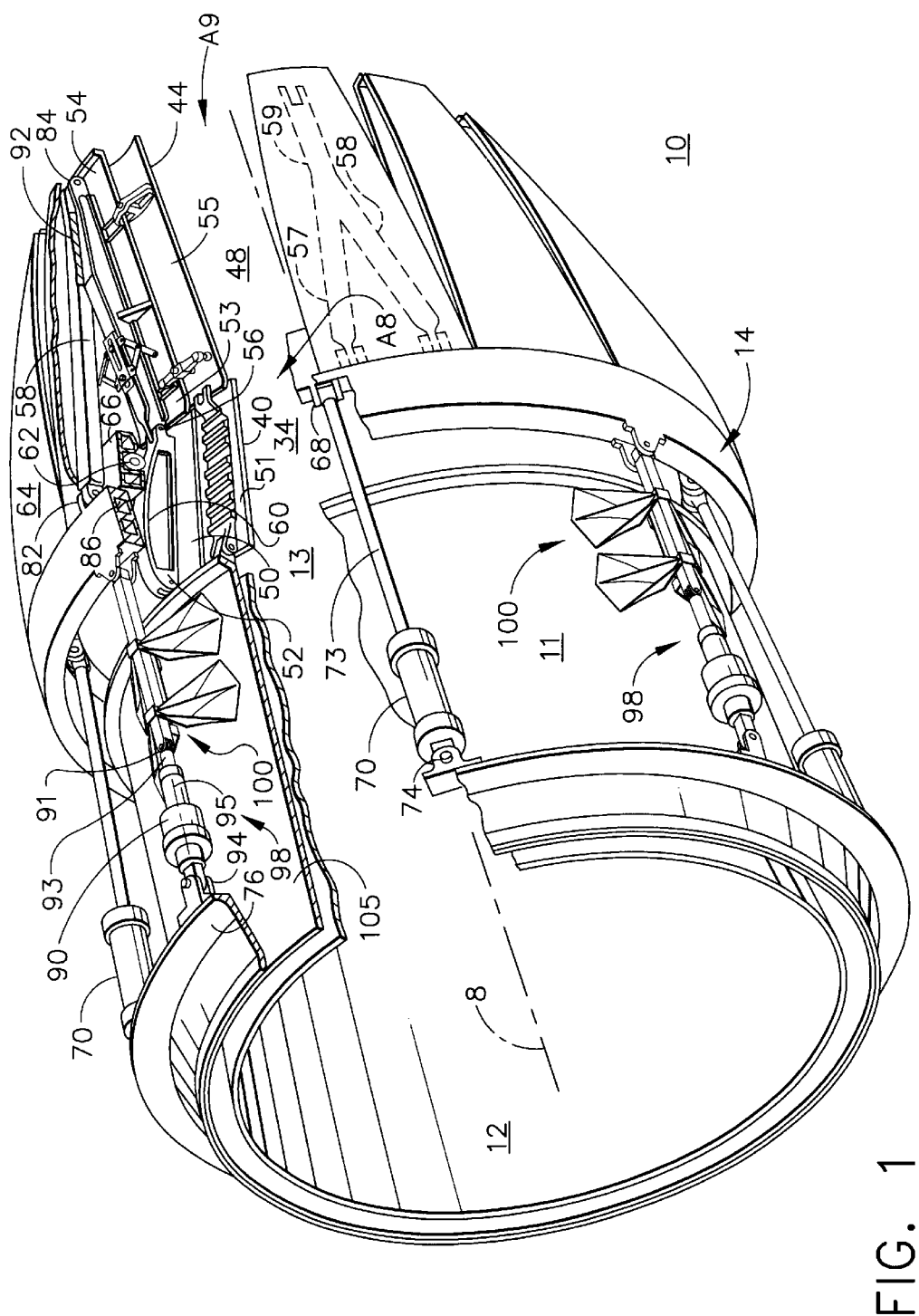
FIG. 1 is a partial cut-away perspective view illustration of a gas turbine engine axisymmetric vectoring exhaust nozzle with a linear actuation and vectoring ring support apparatus in accordance with the preferred embodiment of the present invention.

The present invention is illustrated in FIG. 1 as a linear actuation and vectoring ring support apparatus 98 that includes a vectoring ring support apparatus 100 illustrated as part of an exhaust section 10 of an aircraft gas turbine engine comprising in serial flow relationship a fixed area exhaust duct or engine casing 11, including an afterburner liner 12, and a variable area downstream section 13 having an axisymmetric vectoring nozzle 14 of the convergent divergent type as referenced previously in the Hauer patent.

Referring to FIG. 1, nozzle 14 comprises in serial flow relationship a convergent section 34, a throat 40 and a divergent section 48. The convergent section 34 includes a plurality of convergent or primary flaps 50 circumferentially disposed about an engine centerline 8 with overlapping primary seals 51 disposed between and in sealing engagement with the radially inward facing surface of circumferentially adjacent primary flaps 50. Primary flap 50 is pivotally attached at its forward end to casing 11 by first pivotal or clevis joint 52. A divergent or secondary flap 54 is pivotally attached at its forward end 53 to the aft end of primary flap 50 by a universal two degree of freedom (2 DOF) joint such as a flap ball joint 56 generally at an axial position in the nozzle 14 which coincides with throat 40. Secondary flaps 54 are generally circumferentially disposed about engine centerline 8 with overlapping divergent or secondary seals 55 disposed between and in sealing engagement with the radially inward facing surface of circumferentially adjacent secondary flaps 54. Throat 40 has associated with it a throat area conventionally referred to as A8 and the nozzle exit 44 is generally at the end of secondary flaps 54 and has an exit area associated with it conventionally referred to as A9.

A plurality of rollers 62 are disposed in a primary ring structure 66 which in turn is translated forward and aft by a plurality of primary actuators 70, of which there are three in the preferred embodiment. More than three primary actuators 70 may be used in conjunction with the present invention. The variable throat area A8 is controlled by the action of cam roller 62 on the cam surface 60 which is formed on the back of primary flap 50. During operation, the high pressure of the exhaust gases within the nozzle force primary flaps 50 and secondary flaps 54 radially outward, thus, keeping cam surface 60 in contact with cam roller 62. A conical annular actuator support 76 is mounted at its narrow forward end to engine casing 11 and primary actuator 70 is pivotally connected to the wide aft end of the conical actuator support 76 by a universal ball joint 74. Primary actuator 70 has an actuator rod 73 which in turn is connected to primary ring structure 66 by a spherical joint 68.

A plurality of vectoring actuators 90, of which there are three in the preferred embodiment, are equi-angularly disposed circumferentially around casing 11 and mounted to conical actuator support 76 by universal ball joints 94 in a similar manner as actuators 70.

A vectoring ring 86 is used to control the positioning or pivoting of secondary flaps 54 to provide thrust vectoring. Secondary flaps 54 are pivotally connected to primary flaps 50 by the flap ball joint 56 and is pivotally controlled in a multi-degree of freedom manner by a plurality of respective Y-frames 59 having control arms 57 and 58 that operably connect vectoring ring 86 to secondary flap 54. Outer flaps 64 are at least partially supported by Y-frames 59 and provide a clean and smooth aerodynamic shape along the exterior of the nozzle.

Figure 2:
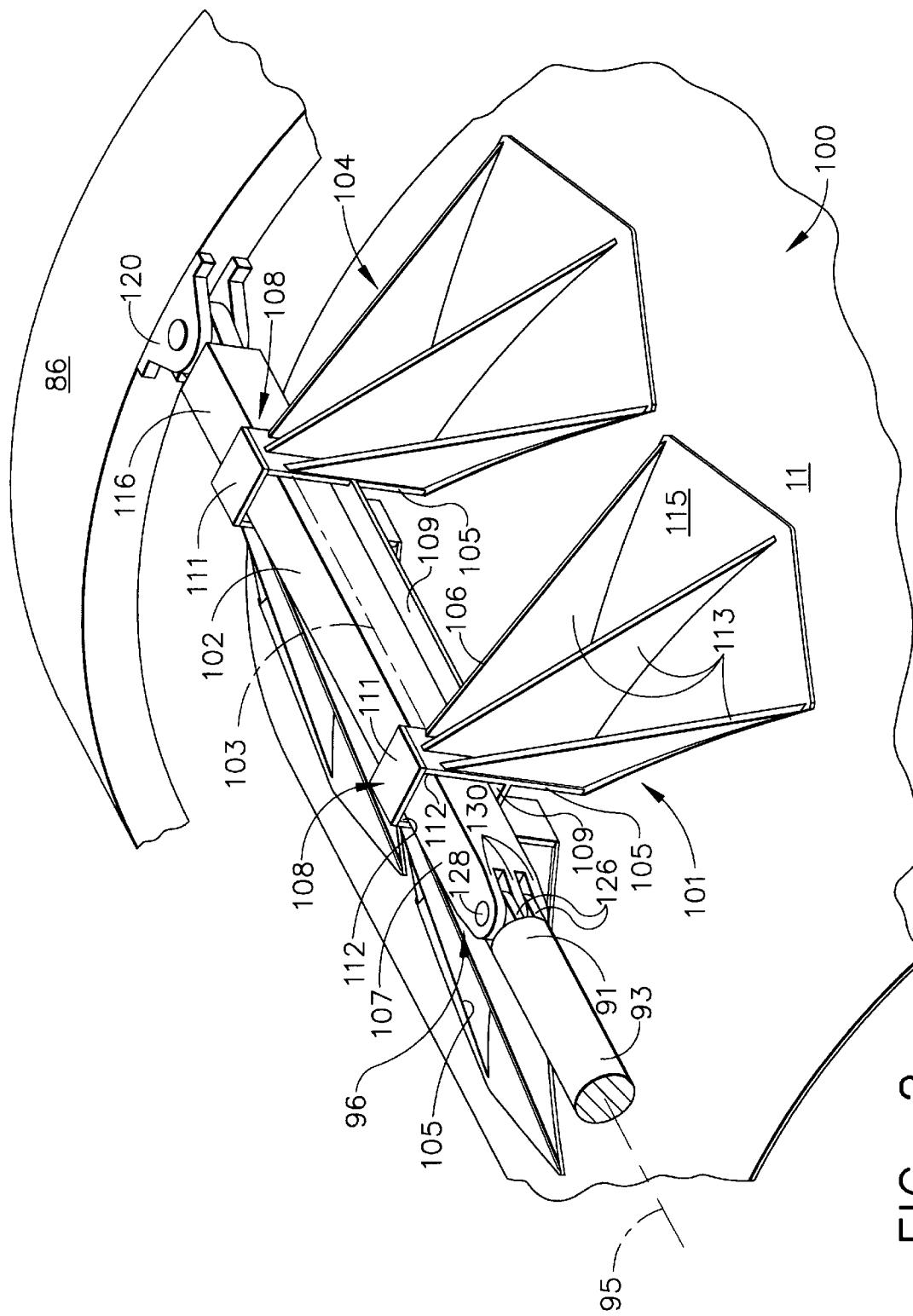
FIG. 2 is an enlarged view of the preferred embodiment of the linear actuation and vectoring ring support apparatus illustrated in FIG. 1.
Figure 3:
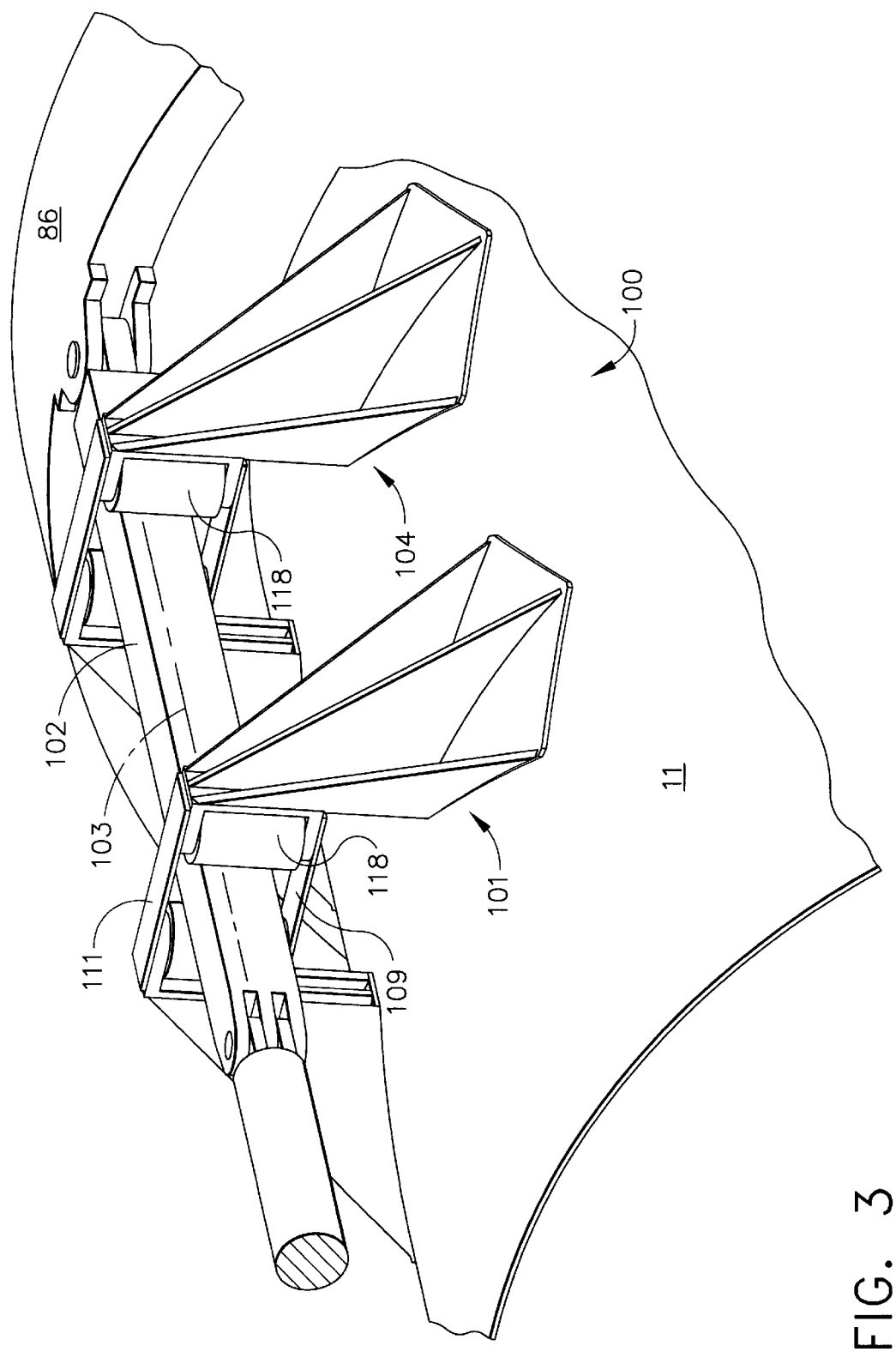
FIG. 3 is a perspective view illustration of a first alternative embodiment of linear actuation and vectoring ring support apparatus illustrated in FIG. 1.

Control arms 57 and 58 are connected to vectoring ring 86 by 3 DOF spherical joints 82 and to the aft end of secondary flap 54 by a spherical joint 84. This linkage is operable to translate an attitude change of vectoring ring 86 into a multi-degree of freedom pivoting change or orbital movement of secondary flap 54 whereby each secondary flap may be pivoted through a different angle. Backbone 92 provides a mount for secondary flap 54 and support for joint 84 and flap ball joint 56 at its two ends. FIGS. 2 and 3 more clearly illustrate how the vectoring ring 86 is supported and actuated by three of the vectoring ring support apparatuses 100. Each of the vectoring ring apparatuses 100 includes at least one and preferably two axially spaced apart forward and aft guide assemblies 101 and 104 respectively. Each guide assembly 104 has a support structure 106 with two circumferentially spaced apart legs 105 that support a hollow guide 108 within which is slidably disposed an axially translatable slider bar 102 having a bar axis 103. The legs 105 are reinforced by braces or gussets 113 attached to a base 115 of the guide assemblies 104 to provide additional strength and stability to the support structure 106. The guide 108 includes circumferentially spaced apart slider surfaces 112 on corresponding sides of the legs 105. Radially inner and outer webs 109 and 111, respectively, connect the legs 105 thus forming the hollow guide 108. The legs 105 are fixedly mounted on a relatively stationary portion of the engine such as the exhaust duct or engine casing 11. The vectoring ring support apparatus 100 provides a circumferential ring support means for slidably supporting the slider bar, restraining circumferential movement of the vectoring ring, and transferring side loads acting on the vectoring ring to a relatively stationary portion of the engine.

Each of the vectoring actuators 90 includes a vectoring actuator rod 93 disposed about an actuator axis 95. A first aft end 91 of the vectoring actuator rod 93 is connected to a first forward end 107 of the slider bar 102 by a forward actuator joint 96 having a single rotational degree of freedom. The forward actuator joint 96 is preferably a clevis joint illustrated as having two lugs 126 on the first aft end 91 of the vectoring actuator rod 93 which are interdigitated with and pivotably pinned by a first pin 128 to three lugs 130 on the first forward end 107 of the slider bar 102. The first pin 128 has an axis that intersects and is perpendicular to the nozzle centerline or engine centerline 8. The clevis joint permits the actuator axis 95 to be out of alignment with the bar axis 103. This accommodates manufacturing and assembly tolerances between the actuator support 76 on the engine casing 11 and the support structure 106. The pinned forward actuator joint 96 also keeps the actuator rod 93 and the slider bar 102 in alignment in a radial plane through the nozzle or engine centerline 8, thus, preventing them from buckling relative to each other.

The vectoring ring 86 is connected to a second aft end 116 of the slider bar 102 by a second joint 120 which is a universal joint and, preferably, a ball joint having three rotational degrees of freedom.

The linear actuation and vectoring ring support apparatuses 98 provides for the vectoring ring 86 to be axially translated and tilted about centerline 8 in order to control its attitude. The three vectoring actuators 90 and the corresponding three linear actuation and vectoring ring support apparatuses 100 are equi-angularly disposed circumferentially about casing 11, that allows vectoring ring 86 to be axially translated and gimballed by the vectoring actuators 90.

The slider bar 102, the forward actuator joint 96, and the second joint 120 allows the actuator 90 to both tilt and translate the vectoring ring 86 by simultaneously or differentially extending the three actuators 90. The guide assembly 104 eliminates the transfer of side loads acting in a direction tangential to the engine casing 11 that may otherwise be imparted to the actuator. The guide assembly 104 allows the slider bar 102 to absorb circumferential loads from vectoring ring 86 and transfer it to the engine casing 11 so that the three vectoring ring support apparatuses 100 act together to prevent sideways movement of the vectoring ring.

Figure 7:
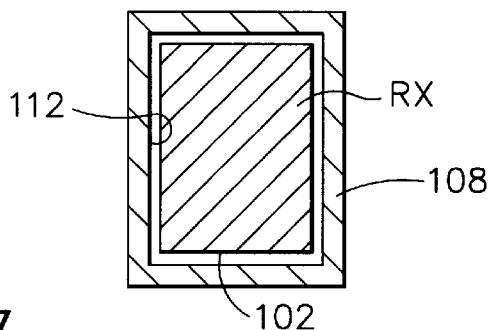
FIG. 7 is a cross-sectional schematical illustration of the slider bar with a rectangular cross-section.
Figure 8:
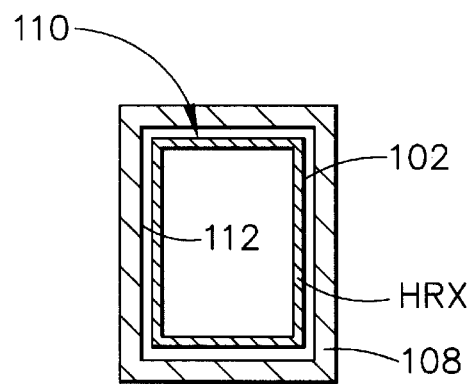
FIG. 8 is a cross-sectional schematical illustration of a hollow slider bar with a hollow rectangular cross-section.
Figure 9:
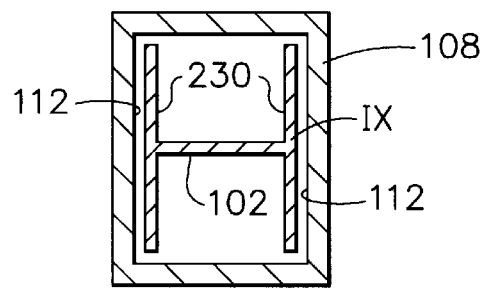
FIG. 9 is a cross-sectional schematical illustration of an I beam slider bar with an I beam cross-section.

The vectoring ring support apparatuses 100 allow attitude adjustment or gimballing and translating of the vectoring ring 86 and also permit axial translation of the vectoring ring to provide control of exit area A9. The slider bar 102 illustrated in FIG. 2 has a solid rectangular cross-section RX as illustrated in FIG. 7 and slides along the slider surfaces 112 inside the hollow guide 108. The slider bar 102 preferably has a hollow rectangular cross-section HRX as illustrated in FIG. 8 and acts as a hollow box beam 110. In another alternative embodiment, illustrated in FIG. 9, the slider bar 102 has I beam cross-section IX with flanges 230 of the I contacting the slider surfaces 112.

An alternative embodiment of the hollow guide 108 is illustrated in FIG. 3, in which the slider surfaces 112 are replaced with rollers 118 which engage the slider bar 102, thus, allowing the slider bar to slide through the guide very easily.

Figure 4:
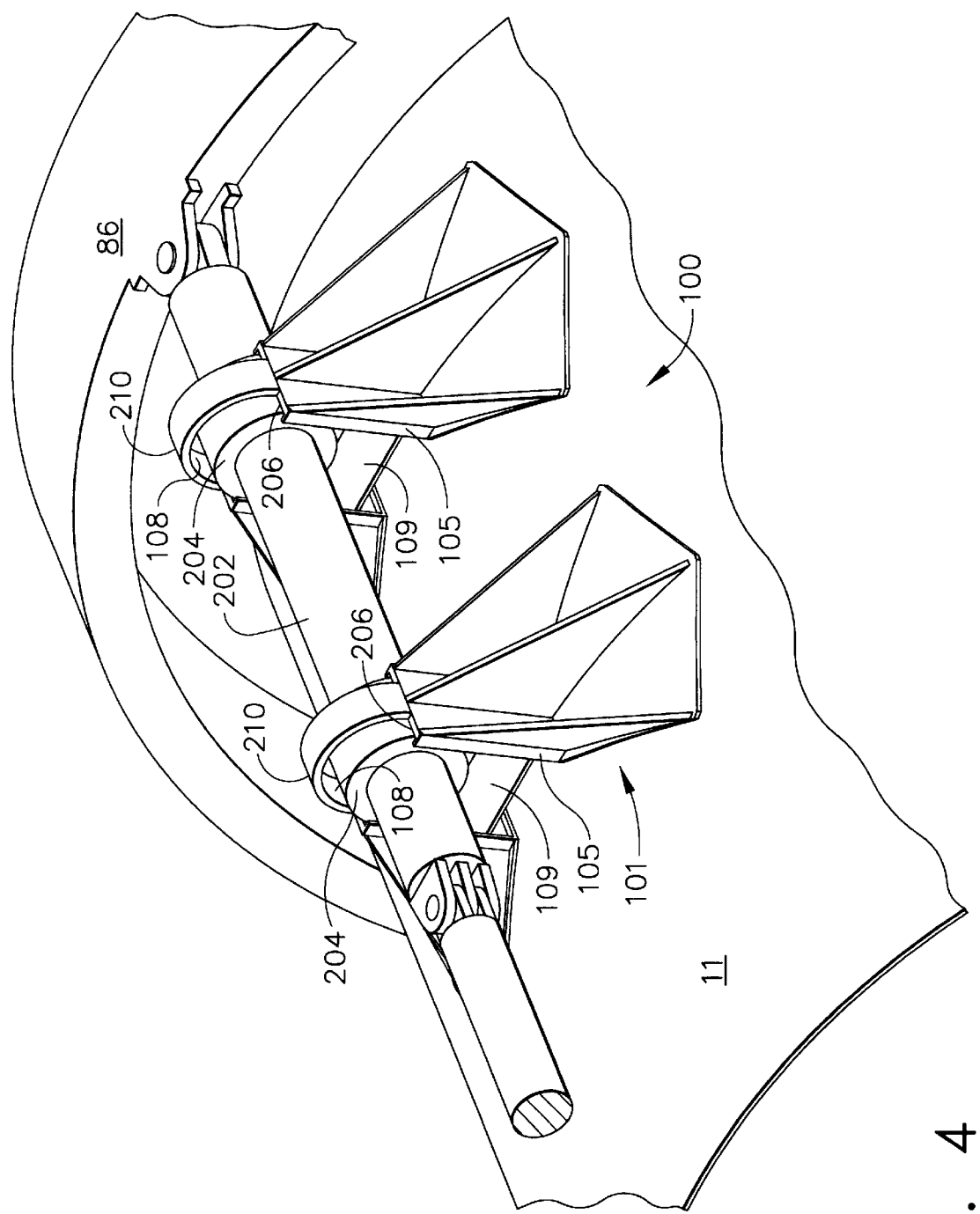
FIG. 4 is a perspective view illustration of a second alternative embodiment of linear actuation and vectoring ring support apparatus illustrated in FIG. 1.
Figure 5:
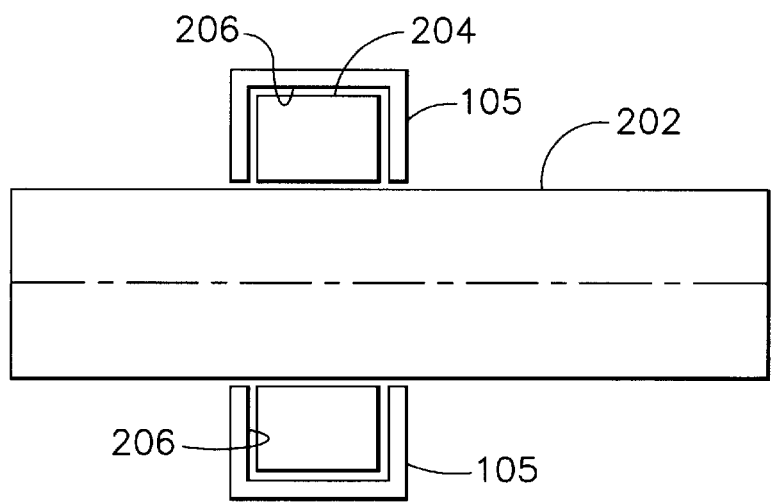
FIG. 5 is a cross-sectional schematical illustration of a cylindrical slider bar mounted within a linear motion bearing in the linear actuation and vectoring ring support apparatus illustrated in FIG. 4.
Figure 6:
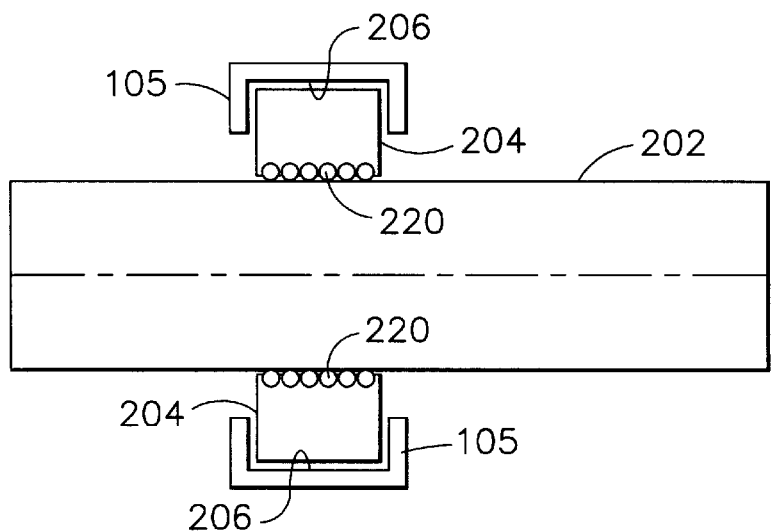
FIG. 6 is a cross-sectional schematical illustration of a cylindrical slider bar mounted within a linear motion bearing having recirculating ball bearings in the linear actuation and vectoring ring support apparatus illustrated in FIG. 4.

Another alternative embodiment of the hollow guide 108 is illustrated in FIGS. 4 and 5 in which the slider bar is a cylindrical slider bar 202 having a circular cross-section. The cylindrical slider bar 202 is slidably disposed within an annular linear motion bearing 204 on each of the guide assemblies 104. The annular linear motion bearing 204 is retained in radially running tracks 206 in the circumferentially spaced apart legs 105 of the of the guide assembly 104. The linear motion bearing 204 in FIG. 5 is illustrated as a journal bearing with a low friction contact surface between the cylindrical slider bar 202 and the linear motion bearing. The tracks 206 are illustrated as grooves cut in legs 105. The annular linear motion bearing 204 can roll in the track 206 and translate radially during vectoring of the nozzle. A radially outer semi-circular web 210 together with the radially inner web 109 connects the legs 105 to form the hollow annual guide 108. This permits limited radial motion of the bearing 204, restrained by the semi-circular web 210 and the radially inner web 109 within the guide 108 to allow the vectoring ring 86 ring to pivot and gimbal. FIG. 6 illustrates an alternative embodiment of the linear motion bearing 204 having recirculating ball bearings 220 between it and the cylindrical slider bar 202.

While the preferred embodiment of our invention has been described fully in order to explain its principles, it is understood that various modifications or alterations may be made to the preferred embodiment without departing from the scope of the invention as set forth in the appended claims.

What is claimed is:

1. A linear actuation and vectoring ring support apparatus for use in an aircraft gas turbine engine vectoring nozzle to actuate and support a vectoring ring, said apparatus comprising:

a linear actuator connected by a slider bar to the vectoring ring, a first actuator joint connecting said linear actuator to a forward end of said slider bar and an aft actuator joint connecting an aft end of said slider bar to the vectoring ring, and a vectoring ring support means for slidably supporting said slider bar, restraining circumferential movement of the vectoring ring, and transferring side loads acting on the vectoring ring to a relatively stationary portion of the engine.

2. An apparatus as claimed in claim 1 wherein said aft actuator joint comprises a 3 degree of freedom means for attaching said slider bar to the vectoring ring.

3. An apparatus as claimed in claim 2 wherein said forward actuator joint has one rotational degree of freedom.

4. An apparatus as claimed in claim 3 wherein said 3 degree of freedom means comprises a ball joint having three rotational degrees of freedom.

5. An apparatus as claimed in claim 3 wherein said forward actuator joint is a clevis joint including two lugs interdigitated with and pivotably pinned to three lugs.

6. An apparatus as claimed in claim 1 wherein said vectoring ring support means comprises at least one guide assembly having a hollow guide mounted on a casing of the engine by a support structure and said slider bar is slidably supported within said guide.

7. An apparatus as claimed in claim 6 wherein said at least one guide assembly is a forward guide assembly and the apparatus further comprises an aft guide assembly wherein said aft guide assembly is spaced apart from and aft of said forward guide assembly.

8. An apparatus as claimed in claim 7 wherein said slider bar is rectangular in cross-section.

9. An apparatus as claimed in claim 8 wherein said slider bar is hollow.

10. An apparatus as claimed in claim 7 further comprising rollers mounted to and inside of said hollow guide and disposed between said guide and said slider bar.

11. An apparatus as claimed in claim 10 wherein said slider bar is rectangular in cross-section.

12. An apparatus as claimed in claim 11 wherein said aft actuator joint comprises a 3 degree of freedom means for attaching said slider bar to the vectoring ring.

13. An apparatus as claimed in claim 12 wherein said forward actuator joint has one rotational degree of freedom.

14. An apparatus as claimed in claim 13 wherein said 3 degree of freedom means comprises a ball joint having three rotational degrees of freedom.

15. An apparatus as claimed in claim 14 wherein said forward actuator joint is a clevis joint including two lugs interdigitated with and pivotably pinned to three lugs.

16. An apparatus as claimed in claim 7 wherein said slider bar is a cylindrical slider bar and said support includes a linear motion bearing within which is slidably mounted said slider bar.

17. An apparatus as claimed in claim 16 wherein each of said forward and aft guide assemblies further comprises;

circumferentially spaced apart legs connected by radially inner and outer webs, a radially running track in each of said legs between said webs, and said linear motion bearing disposed within which said tracks and radially restrained by radially inner and outer webs respectively.

18. An apparatus as claimed in claim 17 further comprising recirculating ball bearings disposed between said cylindrical slider bar and said linear motion bearing.

19. An aircraft gas turbine engine axisymmetric vectoring exhaust nozzle comprising:

a vectoring ring operably linked to a plurality of pivotal flaps by universal joints having at lest two rotational degrees of freedom and circumferentially disposed about a nozzle centerline and bounding an exhaust gas flowpath in the nozzle;

a linear actuation and vectoring ring support apparatus for use in an aircraft gas turbine engine vectoring nozzle to actuate and support a vectoring ring, said assembly comprising;

a linear actuator connected by a slider bar to the vectoring ring, a first actuator joint connecting said linear actuator to a forward end of said slider bar and an aft actuator joint connecting an aft end of said slider bar to the vectoring ring, and a vectoring ring support means for slidably supporting said slider bar, restraining circumferential movement of the vectoring ring, and transferring side loads acting on the vectoring ring to a relatively stationary portion of the engine.

20. A nozzle as claimed in claim 19 wherein said aft actuator joint comprises a 3 degree of freedom means for attaching said slider bar to the vectoring ring.

21. A nozzle as claimed in claim 20 wherein said forward actuator joint has one rotational degree of freedom.

22. A nozzle as claimed in claim 21 wherein said 3 degree of freedom means comprises a ball joint having three rotational degrees of freedom.

23. A nozzle as claimed in claim 21 wherein said forward actuator joint is a clevis joint including two lugs interdigitated with and pivotably pinned to three lugs.

24. A nozzle as claimed in claim 18 wherein said vectoring ring support means comprises at least one guide assembly having a hollow guide mounted on a casing of the engine by a support structure and said slider bar slidably supported within said guide.

25. A nozzle as claimed in claim 24 wherein said at least one guide assembly is a forward guide assembly and the nozzle further comprises an aft guide assembly wherein said aft guide assembly is spaced apart from and aft of said forward guide assembly.

26. A nozzle as claimed in claim 25 wherein said slider bar is rectangular in cross-section.

27. A nozzle as claimed in claim 26 wherein said slider bar is hollow.

28. A nozzle as claimed in claim 25 further comprising rollers mounted to and inside of said hollow guide and disposed between said guide and said slider bar.

29. A nozzle as claimed in claim 28 wherein said slider bar is rectangular in cross-section.

30. A nozzle as claimed in claim 29 wherein said aft actuator joint comprises a 3 degree of freedom means for attaching said slider bar to the vectoring ring.

31. A nozzle as claimed in claim 30 wherein said forward actuator joint has one rotational degree of freedom.

32. A nozzle as claimed in claim 31 wherein said 3 degree of freedom means comprises a ball joint having three rotational degrees of freedom.

33. A nozzle as claimed in claim 32 wherein said forward actuator joint is a clevis joint including two lugs interdigitated with and pivotably pinned to three lugs.

34. A nozzle as claimed in claim 25 wherein said slider bar is a cylindrical slider bar and said support structure includes a linear motion bearing within which is slidably mounted said slider bar.

35. A nozzle as claimed in claim 34 wherein said support further comprises;

circumferentially spaced apart legs connected by radially inner and outer webs, a radially running track in each of said legs between said webs, and said linear motion bearing disposed within which said tracks and radially restrained by radially inner and outer webs respectively.

36. A nozzle as claimed in claim 35 further comprising recirculating ball bearings disposed between said cylindrical slider bar and said linear motion bearing.

\* \* \* \* \*